United States Patent
Schirrmann et al.

(10) Patent No.: US 11,442,441 B2
(45) Date of Patent: Sep. 13, 2022

(54) TEST SYSTEM AND ROBOT ARRANGEMENT FOR CARRYING OUT A TEST

(71) Applicant: Airbus Defence and Space GmbH, Taufkirchen (DE)

(72) Inventors: Arnd Schirrmann, Hamburg (DE); Omid Omidwar, Hamburg (DE)

(73) Assignee: Airbus Defence and Space GmbH

( * ) Notice: Subject to any disclaimer, the term of this patent is extended or adjusted under 35 U.S.C. 154(b) by 982 days.

(21) Appl. No.: 16/181,855

(22) Filed: Nov. 6, 2018

(65) Prior Publication Data
US 2019/0146467 A1 May 16, 2019

(30) Foreign Application Priority Data
Nov. 13, 2017 (DE) ............ 10 2017 126 560.0

(51) Int. Cl.
| | |
|---|---|
| G05B 23/02 | (2006.01) |
| G06F 11/07 | (2006.01) |
| G05B 19/042 | (2006.01) |
| B25J 9/16 | (2006.01) |

(52) U.S. Cl.
CPC .......... *G05B 23/021* (2013.01); *B25J 9/1679* (2013.01); *G05B 19/0428* (2013.01); *G05B 23/0256* (2013.01); *G06F 11/0739* (2013.01); *G05B 2219/23067* (2013.01); *G05B 2219/24048* (2013.01)

(58) Field of Classification Search
CPC ............. G05B 23/021; G05B 23/0256; G05B 9/0428; G05B 2219/23067; G05B 2219/24048; G06F 11/0739; G06F 11/3664; B25J 9/1679
See application file for complete search history.

(56) References Cited

U.S. PATENT DOCUMENTS

| | | | |
|---|---|---|---|
| 9,015,654 B2 * | 4/2015 | Kaasila | G06F 11/3664 |
| | | | 702/186 |
| 9,989,593 B2 * | 6/2018 | Wager | G01R 31/31907 |
| 2004/0210798 A1 * | 10/2004 | Higashi | G01R 31/31907 |
| | | | 714/27 |
| 2016/0337053 A1 | 11/2016 | Diperna et al. | |
| 2017/0277185 A1 | 9/2017 | Duda et al. | |

OTHER PUBLICATIONS

Mao et al., Robotic Testing of Mobile Apps for Truly Black-Box Automation, IEEE Software, vol. 34, Mar. 2017, Issue 2, pp. 11-16.
Sogeti High Tech: Collaborative robotics for testing at Airbus Helicopters, Online Video, veroffentlicht am May 24, 2017, Link: https://www.youtube.com/watch?v=nMAK3uQ3rCc.

* cited by examiner

*Primary Examiner* — An H Do
(74) *Attorney, Agent, or Firm* — Lerner, David, Littenberg, Krumholz & Mentlik, LLP

(57) ABSTRACT

A test system is includes a management server which is configured to provide predefined test instructions, a monitoring system, and at least one execution entity. The monitoring system is configured to convert test instructions provided by the management server into operating instructions for setting a test configuration on a control unit of a system using predefined assignment logic. The at least one execution entity is configured to set the test configuration on the control unit of the system on the basis of operating instructions transmitted by the monitoring system to the at least one execution entity.

14 Claims, 5 Drawing Sheets

TEST SYSTEM AND ROBOT ARRANGEMENT FOR CARRYING OUT A TEST

FIELD OF THE INVENTION

The present invention relates to a test system for testing a control unit of a system and relates, in particular, to a robot arrangement and to a method for testing a control unit of a system.

BACKGROUND OF THE INVENTION

When producing a system, for example an aircraft, it is necessary to test a control unit of the system in order to ensure a functionality of the control unit.

In complex systems in particular, for example a cockpit of an aircraft, numerous setting operations are needed to test or check all configurations or functions of the cockpit. A test method for such a system is very time-consuming using engineers to set respective configurations.

BRIEF SUMMARY OF THE INVENTION

There is therefore a need to further improve and accelerate a sequence for testing control units.

Aspects of the present invention provide a test system for testing a control unit of a system. The test system comprises a management server which is configured to provide predefined test instructions. The test system also comprises a monitoring system which is configured to convert test instructions provided by the management server into operating instructions for setting a test configuration on a control unit of a system using predefined assignment logic. The monitoring system is also configured to forward operating instructions to at least one execution entity. The test system also comprises at least one execution entity which is configured to set the test configuration on the control unit of the system on the basis of operating instructions transmitted by the monitoring system to the at least one execution entity.

The term "test instruction" relates to sequences, that is to say temporal and/or logical sequences for setting at least one test configuration on a control unit.

The term "test configuration" relates to a specific configuration, that is to say a specific state of control elements of a control unit or a sequence of different states of control elements of a control unit over time.

The term "operating instruction" relates to information for setting respective control elements of a control unit.

The term "assignment logic" relates to instructions for converting test instructions into operating instructions. For example, assignment logic comprises instructions for converting test instructions into operating instructions, wherein the operating instructions comprise control commands for moving a robot arm, by means of which a test configuration corresponding to the test instructions can be set on a control unit.

A test configuration is set on a control unit, for example, in order to check a function of the control unit and/or a function of a system controlled by the control unit in response to the test configuration being set. In order to check a system and/or a test configuration, the test system comprises, in one example, a system interface which is configured to set the system on the basis of test instructions predefined by the management server, to capture a state of the system and to transmit the captured state of the system to the management server. In this case, the management server is also configured to check the test configuration set on the control unit using the state of the system captured by the system interface by comparing the state of the system captured by the system interface with a desired state of the system predefined for the test configuration which has been set, for example.

In one example, the monitoring system is configured to transmit a multiplicity of operating instructions to a multiplicity of execution entities and to coordinate them.

In one example, the test system comprises at least one user interface. The at least one user interface can be configured to receive information transmitted by the at least one execution entity and/or the management server as an intermediate station and to output it on an output unit and/or to edit it.

A user interface makes it possible for an engineer to monitor and possibly change a test which is running in an automatic or semiautomatic manner and which runs using the test system.

Another aspect of the invention also provides a robot arrangement for setting a control unit of a system. The robot arrangement comprises at least one processor, at least one sensor and at least one actuator. The at least one processor is configured to receive operating instructions provided by a monitoring system, which is configured to convert test instructions provided by a management server into operating instructions for setting a test configuration on a control unit of a system using predefined assignment logic, and to set the test configuration on control elements of the control unit of the system on the basis of the operating instructions using the at least one actuator.

In one example, the at least one processor is also configured to capture a state of at least one control element of the control unit using the at least one sensor, to compare the captured state of the at least one control element with a predefined desired state and to set the at least one control element in a manner corresponding to the predefined desired state.

Yet another aspect of the invention also provides a method for testing a control unit of a system using a test system. The method comprises the following steps of:

a) providing predefined test instructions by means of a management server;

b) converting the test instructions provided by the management server into operating instructions for setting a test configuration on a control unit of a system using predefined assignment logic by means of a monitoring system;

c) transmitting the operating instructions to at least one execution entity by means of the monitoring system;

d) setting the test configuration on the control unit on the basis of test instructions predefined by the management server by means of the at least one execution entity.

According to one example, the method also comprises the steps of:

e) capturing and forwarding a state of the system to the management server by means of a system interface in response to the test configuration being set on the control unit;

f) checking the test configuration set on the control unit using the state of the system captured by the system interface by means of the management server.

An embodiment of the invention presented is used, in particular, to automatically carry out test instructions of a test for a system. For this purpose, provision is made, in one example, for the test instructions to be provided by a management server, to be converted into operating instructions by a monitoring unit and to be forwarded to at least one execution entity, for example a robot. In this case, a user interface can be provided in a further example, which user interface can be used by an engineer to monitor and/or edit the creation of the operating instructions and/or their forwarding to the at least one execution entity.

These and further aspects of the present invention will become clear with reference to the embodiments described below.

BRIEF DESCRIPTION OF THE DRAWINGS

Exemplary embodiments of the invention are described below with reference to the following drawings. In the drawings, identical features are indicated by means of identical reference signs.

DETAILED DESCRIPTION

Figure 1:
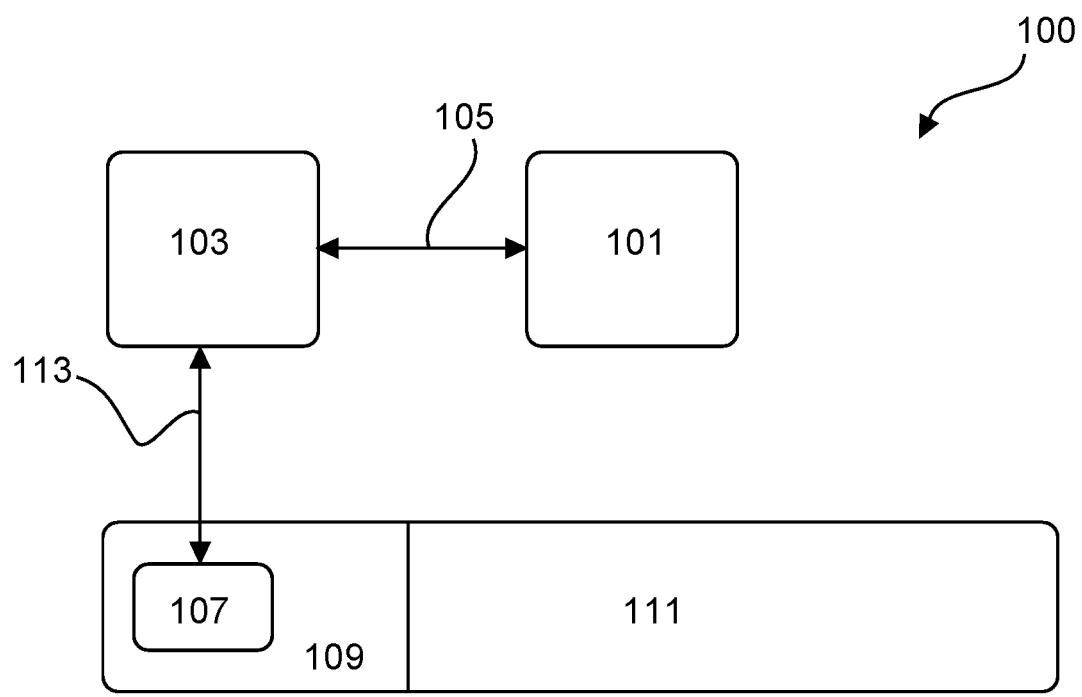
FIG. 1 shows a schematic illustration of an example of a test system.

FIG. 1 shows a test system 100 having a management server 101 which is communicatively connected to a monitoring system 103, as indicated by arrow 105. The management server 101 can be connected to the monitoring system 103 via a wired or wireless communication interface, for example.

The management server 101 is provided with test instructions, for example so-called "Ground Testing Instructions", by a source, for example a database or an engineer. The test instructions may comprise, for example, information relating to which control elements on a control unit 109 are to be set in which order with which parameters for a respective test configuration.

The management server 101 transmits respective test instructions provided by the source to the monitoring system 103.

The monitoring system 103 converts the test instructions transmitted by the management server 101 into operating instructions for setting control elements on the control unit 109 according to the test configuration. For this purpose, the monitoring system uses predefined assignment logic and assigns corresponding operating instructions to respective test instructions.

For example, provision may be made for the monitoring system 103 to assign, to a test instruction "switch on control unit", an operating instruction comprising a control command which causes at least one execution entity 107, which may be in the form of a robot arm for example, to move to a control element for switching on the control unit and to be used there to activate the control element, that is to say to press a pushbutton of the control unit 109 of an aircraft 111, for example.

The monitoring system 103 can communicate with the at least one execution entity 107 via a wired or wireless communication connection, as indicated by arrow 113.

In one example, a plurality of execution entities 107 comprising a plurality of robot arms or robot arrangements, for example, can be provided. If a multiplicity of execution entities 107 are used, the monitoring system 103 can be configured to coordinate different operating instructions between respective execution entities 107, that is to say to temporally and/or logically divide respective operating instructions among respective execution entities 107. For this purpose, provision may be made for the respective operating instructions to be divided among the respective execution entities 107 by the monitoring system 103 in a sequence, with the result that the respective execution entities 107 set one or more test configurations on the control unit 109 together and in a manner matched to one another.

In order to match respective operating instructions for respective execution entities 107 to one another, the monitoring system 103 can assign the operating instructions to respective execution entities 107 according to a predefined scheme. Alternatively, the monitoring system 103 can dynamically divide or distribute the operating instructions among respective execution entities, for example on the basis of a current availability and/or respective properties of respective execution entities 107. For this purpose, the monitoring system 103 may use, for example, a list of properties of respective execution entities 107, in which properties, for example usable tools, a range and/or a status of the respective execution entities 107, are stored.

For example, operating instructions may comprise control commands for orientation of the execution entity 107 when setting a test configuration on the control unit 109. This means that the operating instructions may comprise, for example, information relating to a form and/or a function of a respective control element, on the basis of which the execution entity is oriented using an optical sensor on the control unit 109, for example.

The operating instructions may also comprise, for example, information relating to the position at which, for example the coordinate in a spatial coordinate system at which, a respective control element can be found on the control unit 109 and relating to the position to which the execution entity 107 should be moved in order to set a control element according to a respective test configuration.

The operating instructions can also comprise, for example, information relating to a digital model of the control unit and/or of the system. Accordingly, provision may be made, for example, for an environment captured by means of a sensor (not illustrated here) to be compared with the digital model in order to identify and set respective control elements.

The execution entity 107 can be configured, for example, to automatically set mechanical control elements and/or to read optical and/or acoustic information provided by a respective control unit or a respective control element.

The test system 100 is used, in particular, to check an aircraft in a ground test after final manufacture and to reduce checking steps to be manually carried out by one or more engineers.

Figure 2:
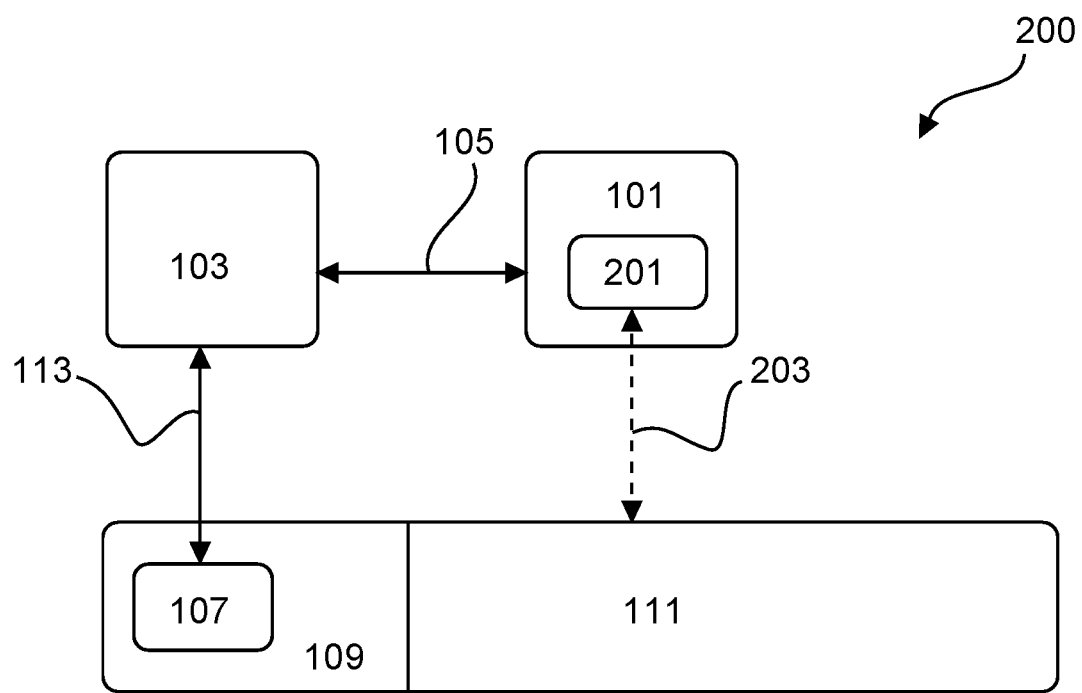
FIG. 2 shows a schematic illustration of an example of a test system having a system interface.

FIG. 2 shows a test system 200. The test system 200 is based on the test system 100 and additionally comprises a system interface 201. The system interface 201 is configured here as part of the management server 101. However, the system interface 201 can also be configured as a separate unit or as part of the monitoring system 103.

The system interface 201 is communicatively connected to the aircraft 111, as indicated by arrow 203. For this purpose, the system interface 201 can interchange data with the aircraft 111 in a wired or wireless manner.

For example, the system interface 201 is used to set and/or capture a state on the aircraft 111. For this purpose, the system interface can access control devices of the aircraft 111, for example.

The system interface 201 can be in the form of a so-called "digital equipment simulator", for example.

In order to check a respective test configuration set on the control unit 109, the system interface 201 can set a predefined state on the aircraft 111 and/or can read a current state of the aircraft 111 and can transmit it to the management server 101. On the basis of information relating to a state of the aircraft 111 transmitted to the management server 101, the management server 101 can compare the current test configuration of the control unit 109, which may be a control panel or a "cockpit" of the aircraft 111 for example, with the state of the aircraft 111 and can thereby check a function of the test configuration currently set on the control unit 109.

The system interface 201 can be used to capture interaction between the aircraft 111 and the control unit 109.

Figure 3:
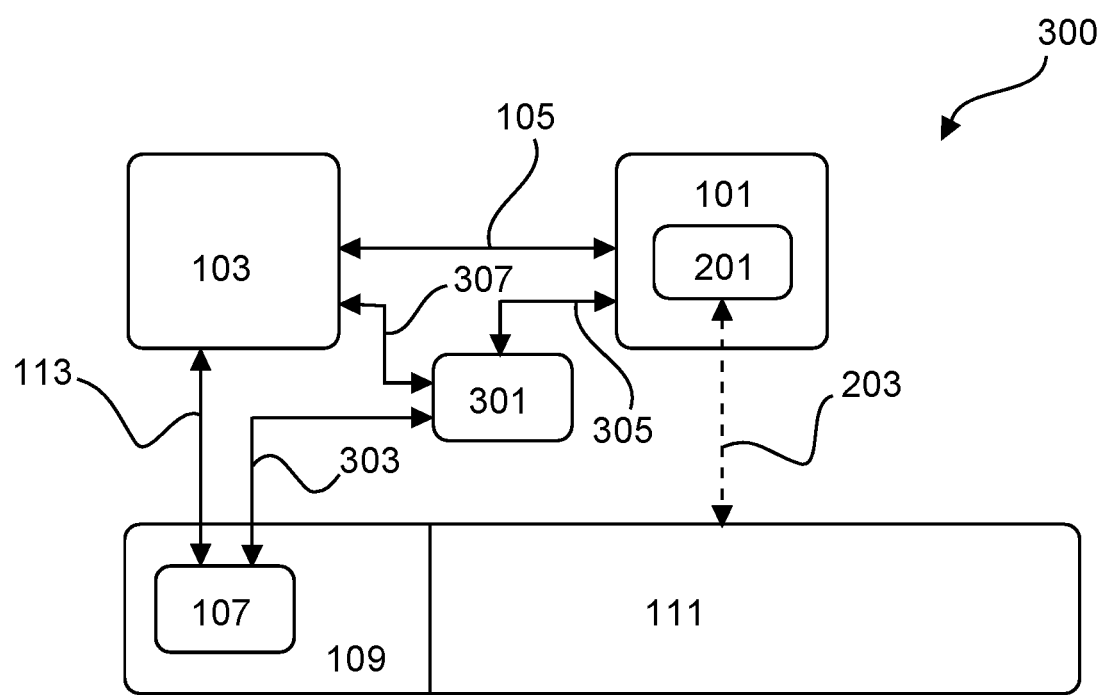
FIG. 3 shows a schematic illustration of an example of a test system having a system interface and a user interface.

FIG. 3 shows a test system 300. The test system 300 is based on the test system 200 and additionally comprises a user interface 301.

The user interface 301 may be in the form of a mobile computing unit or a stationary system, for example. It goes without saying that the user interface 301 may also be integrated in the management server 101 or the monitoring system 103.

The user interface 301 may be communicatively connected to the execution entity 107 in a wired or wireless manner, as indicated by arrow 303.

As a result of a communication connection between the user interface 301 and the execution entity 107, a current state, for example an operating instruction currently assigned to the execution entity 107, can be displayed to a user, for example an engineer, and/or can be edited by the user using the user interface 301.

As a result of a communication connection between the user interface 301 and the management server 101, a current test instruction can be displayed to a user, for example an engineer, and/or can be edited by the user using the user interface 301.

Furthermore, as a result of a communication connection between the user interface 301 and the management server 101, a state of the aircraft 111 can be displayed and/or edited using the system interface 210.

As a result of a communication connection between the user interface 301 and the monitoring system 103, conversions of test instructions into operating instructions, which are carried out by the monitoring system 103, and/or assignments of respective operating instructions to respective execution entities 107, which are carried out by the monitoring system 103, can be displayed to a user, for example an engineer, and/or can be edited by the user using the user interface 301.

The user interface 301 can be communicatively connected to a multiplicity of test systems or a multiplicity of execution entities and/or a multiplicity of management servers and/or a multiplicity of monitoring systems in order to make it possible for a user to centrally monitor and/or control a multiplicity of test procedures for a multiplicity of systems, for example.

Figure 4:
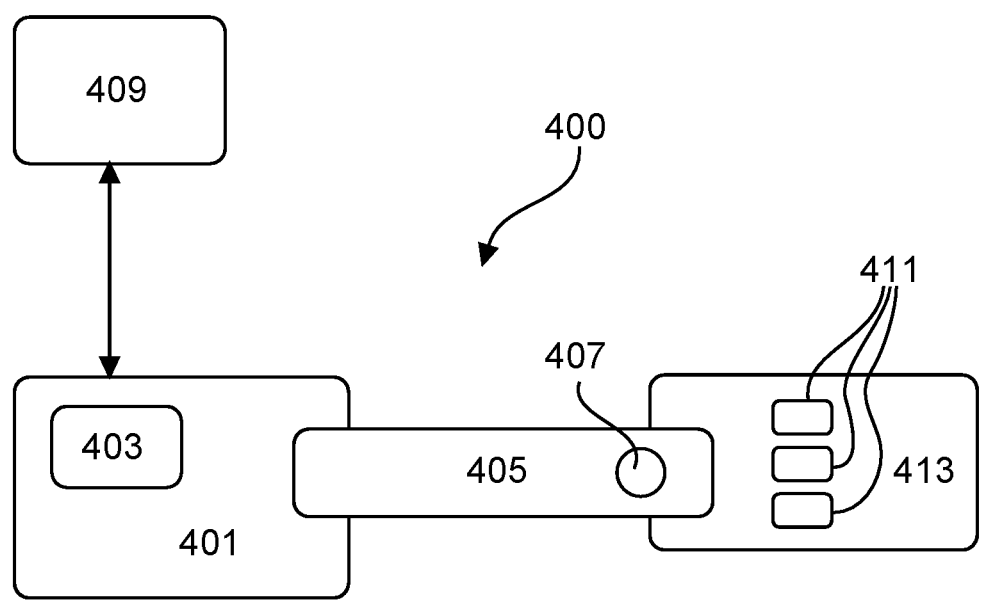
FIG. 4 shows a schematic illustration of an example of a robot arrangement.

FIG. 4 shows a robot arrangement 400. The robot arrangement 400 comprises a mobile platform having a server 401 and a processor 403. The robot arrangement 400 also comprises an actuator 405 in the form of a robot arm and a sensor 407. The robot arrangement is communicatively connected to a monitoring system 409 via a wired or wireless communication interface, as indicated by arrow 415.

The robot arrangement 400 is used, in particular, to set a test configuration on a control unit 413 by setting control elements 411 of the control unit 413 by means of the actuator 405.

The processor 403 is configured, for example, to receive operating instructions provided by the monitoring system 409, which is configured to convert test instructions provided by a management server into operating instructions for setting the test configuration on the control unit 413 using predefined assignment logic, and to set the test configuration on the control elements 411 of the control unit 413 on the basis of the operating instructions using the actuator 405. Accordingly, the processor 403 controls the robot arm according to the operating instructions provided by the monitoring system 409.

For example, the operating instructions provided by the monitoring system 409 may comprise information relating to how a respective control element 411 can be identified. For this purpose, the monitoring system 409 can provide reference patterns for sensor information which are compared by the processor 403 with information determined by the sensor 407 which may be, for example, an optical and/or an acoustic sensor and any other sensor suitable for capturing a control element 411 or a state of a control element 411. This means that, in one example, the robot arm can be independently oriented with respect to the control unit 413 using operating instructions provided by the monitoring system 409 in order to identify a respective control element 411, to set the latter if necessary and/or to capture a state of the control element 411.

For example, the processor 403 can be configured to transmit a state of a respective control element 411 captured using the sensor 407 to the monitoring system 409 and/or to a further communication partner, for example a management server (not illustrated here) and/or a user interface (not illustrated here).

Figure 5:
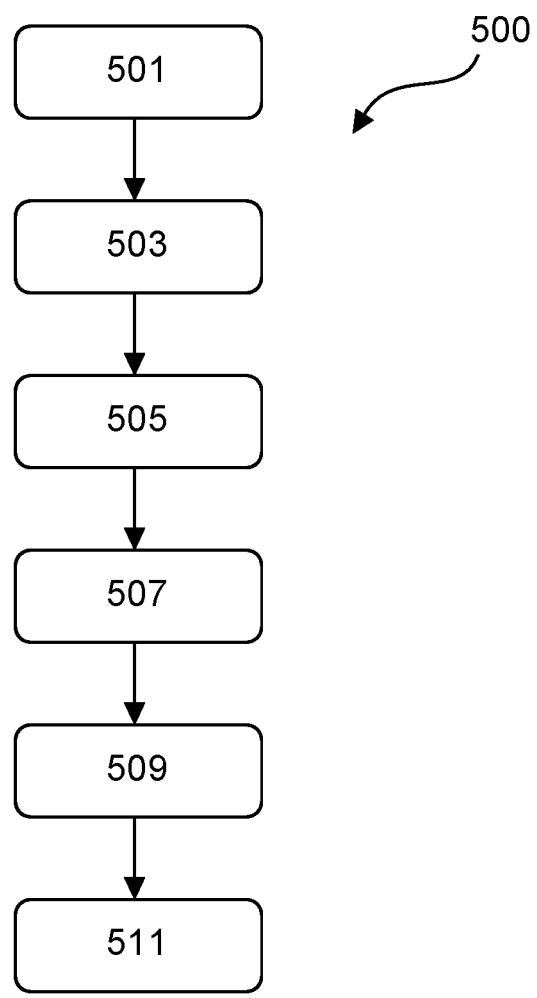
FIG. 5 shows a schematic illustration of an example of a method for testing a control unit of a system using an example of a test system.

FIG. 5 shows an example of a method 500 for testing a control unit of a system using a test system. The method 500 comprises the following steps:

In a first step 501, also referred to as step a), a predefined test instruction is provided by a management server.

In a second step 503, also referred to as step b), the test instructions provided by the management server are converted into operating instructions for setting a test configuration on a control unit of a system using predefined assignment logic by means of a monitoring system.

In a third step 505, also referred to as step c), the operating instructions are transmitted by the monitoring system to at least one execution entity.

In a fourth step 507, also referred to as step d), the test configuration is set on the control unit on the basis of test instructions predefined by the management server by means of the at least one execution entity.

In an optional fifth step 509, also referred to as step e), a state of the system is captured and is forwarded to the management server by means of a system interface in response to the test configuration being set on the control unit.

In an optional sixth step 511, also referred to as step f), the test configuration set on the control unit is checked by the management server using the state of the system captured by the system interface.

According to another aspect, the invention relates to a computer program element for controlling a test system, as described above, and to a computer-readable medium, for example a CD-ROM or a USB stick, on which the program element is stored. The computer program element can be distributed on a suitable medium, for example a read-only memory, for example together with hardware elements or in other forms, for example via the Internet or other wired or wireless communication protocols.

Furthermore, the computer program element can be loaded into a main memory of a processor in a computer network, for example, and can be executed in order to carry out the method described above.

It is pointed out that embodiments of the invention are described with respect to different subjects. In particular, some embodiments are described with respect to the method claims, while other embodiments are described with respect to the apparatus claims. However, a person skilled in the art in the technical field will gather from the description mentioned above and below that, unless noted otherwise, in addition to any combination of the features of one subject, any combination of the features which relate to different subjects is also considered to be disclosed in this application. However, all features can be combined with one another and thereby provide synergistic effects which are more than a simple summation of the features.

Although the invention has been illustrated and described in detail in the figures and the above description, such an illustration and description should be considered for illustration purposes or exemplary and not restrictive. The invention is not restricted to the embodiments disclosed. Further variations of the embodiments disclosed can be understood and effected by a person skilled in the art in the technical field by studying the figures, the disclosure and the dependent claims.

In the claims, the word "comprising" does not exclude any other elements or steps and the indefinite article "a" or "an" does not exclude a multiplicity. A single apparatus or other unit can perform the functions of different subjects mentioned in the claims. The mere fact that particular steps are recited in mutually exclusive dependent claims does not indicate that a combination of these steps cannot be advantageously used. Any reference signs in the claims are not to be regarded as a limitation of the scope of protection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A test system for testing a control unit of a system, wherein the test system comprises:
   a management server configured to provide predefined test instructions;
   a monitoring system configured to convert test instructions provided by the management server into operating instructions for setting a test configuration on a control unit of a system using predefined assignment logic, wherein the monitoring system is also configured to forward operating instructions to at least one execution entity; and
   at least one execution entity configured to set the test configuration on the control unit of the system on the basis of operating instructions transmitted by the monitoring system to the at least one execution entity.

2. The test system according to claim 1, wherein the at least one execution entity comprises at least one robot arm.

3. The test system according to claim 2, wherein the test system comprises a system interface configured to set the system on the basis of test instructions predefined by the management server, to capture a state of the system and to transmit the captured state of the system to the management server, and wherein the management server is also configured to check the test configuration set on the control unit using the state of the system captured by the system interface.

4. The test system according to claim 1, wherein the operating instructions comprise control commands for orienting the at least one execution entity when setting the test configuration on the control unit.

5. The test system according to claim 4, wherein the information for orientation comprises control commands for detecting an object of the system using at least one optical sensor and/or instructions for moving at least one actuator of the at least one execution entity.

6. The test system according to claim 1, wherein the control unit is a control panel of an aircraft arranged in a cockpit.

7. The test system according to claim 1, wherein the monitoring system is configured to transmit a multiplicity of operating instructions to a multiplicity of execution entities and to coordinate them.

8. The test system according to claim 1, wherein the test system comprises at least one user interface, wherein the at least one user interface is configured to receive information transmitted by the at least one execution entity and/or the management server as an intermediate station and to output it on an output unit and/or to edit it.

9. The test system according to claim 1, wherein the monitoring system is in the form of a separate system or a module implemented in the management server.

10. A computer-readable medium on which a program element for controlling a test according to claim 1 is stored, the computer program element, when executed by one or more processors, causes the one or more processors to:
    provide predefined test instructions by a management server;
    convert the test instructions provided by the management server into operating instructions for setting a test configuration on a control unit of a system using predefined assignment logic by means of a monitoring system;
    transmit the operating instructions to at least one execution entity by the monitoring system; and
    set the test configuration on the control unit on the basis of test instructions predefined by the management server by the at least one execution entity.

11. A robot arrangement for setting a control unit of a system, wherein the robot arrangement comprises:
    at least one processor;
    at least one sensor; and
    at least one actuator,
    wherein the at least one processor is configured to receive operating instructions provided by a monitoring system configured to convert test instructions provided by a management server into operating instructions for setting a test configuration on a control unit of a system using predefined assignment logic, and to set the test configuration on control elements of the control unit of the system on the basis of the operating instructions using the at least one actuator.

12. The robot arrangement according to claim 11, wherein the at least one processor is further configured to capture a state of at least one control element of the control unit using the at least one sensor, to compare the captured state of the at least one control element with a predefined desired state and to set the at least one control element according to the predefined desired state.

13. A method for testing a control unit of a system using a test system, comprising:
   a) providing predefined test instructions by a management server;
   b) converting the test instructions provided by the management server into operating instructions for setting a test configuration on a control unit of a system using predefined assignment logic by means of a monitoring system;
   c) transmitting the operating instructions to at least one execution entity by the monitoring system; and
   d) setting the test configuration on the control unit on the basis of test instructions predefined by the management server by the at least one execution entity.

14. The method according to claim 13, wherein the method further comprises:
   e) capturing and forwarding a state of the system to the management server by a system interface in response to the test configuration being set on the control unit; and
   f) checking the test configuration set on the control unit using the state of the system captured by the system interface by the management server.

* * * * *